United States Patent [19]

Doerfel et al.

[11] 4,055,547

[45] Oct. 25, 1977

[54] REMOVING ODOROUS FORMALDEHYDE FROM STABILIZED SHAPED POLYOXYMETHYLENES

[76] Inventors: Helmut Doerfel, 152 Bergstrasse, 6900 Heidelberg 1; Franz Schmidt, 3 Trommstrasse, 6800 Mannheim 1; Wilhelm Schuette, 5 Frankstrasse, 6720 Speyer; Claus Cordes, 13 Halbergstrasse, 6719 Weisenheim; Wolfgang Schenk, 1 Carl-Goerdeler-Strasse, 6830 Schwetzingen, all of Germany

[21] Appl. No.: 588,819

[22] Filed: June 20, 1975

[30] Foreign Application Priority Data

July 29, 1974 Germany ............................. 2436384

[51] Int. Cl.² ............................................. C08G 2/28
[52] U.S. Cl. .................................. 260/67 FP; 526/1; 528/480; 528/499

[58] Field of Search ...................... 260/67 FP; 526/1; 528/480, 499

[56] References Cited

U.S. PATENT DOCUMENTS

| 3,477,993 | 11/1969 | Alsup et al. | 260/67 FP |
| 3,488,303 | 1/1970 | Heinz | 260/18 |
| 3,718,630 | 2/1973 | Leverett | 260/67 FP |

Primary Examiner—Lucille M. Phynes
Attorney, Agent, or Firm—Keil, Thompson & Shurtleff

[57] ABSTRACT

Method of removing odorous formaldehyde from stabilized shaped polyoxymethylenes in which an inert gas is caused to flow over stabilized and shaped solid polyoxymethylenes at elevated temperatures not high enough to cause sticking or fusion of the polyoxymethylene, until substantially all of the volatile formaldehyde has been removed.

5 Claims, No Drawings

REMOVING ODOROUS FORMALDEHYDE FROM STABILIZED SHAPED POLYOXYMETHYLENES

Polyoxymethylenes are high-grade plastics which are particularly suitable for engineering applications. They are prepared either by homopolymerization of formaldehyde or trioxane followed by end group closure or by copolymerization with suitable comonomers such as 1,3-dioxolane, ethylene oxide, 1,3-dioxepane or with linear polyacetals such as polydioxolane. The resulting homopolymers or copolymers, which are usually in powder form, are then subjected to stabilization, and antioxidants and thermostabilizers are incorporated in extruders, by means of which the mixture is converted to granules of conventional type. Such stabilized and shaped polyoxymethylenes generally contain small amounts of monomeric formaldehyde. And even polyoxymethylene molding compositions which are virtually free from formaldehyde may form small amounts of formaldehyde in subsequent processing operations such as injection molding and extrusion. This formaldehyde may be present in the molding composition or shaped articles made therefrom in concentrations of from 50 to 1000 ppm depending on the processing conditions. Under standard conditions of temperature and pressure, the formaldehyde slowly diffuses out of the polymer and may create a substantial odor nuisance.

It is an object of the present invention to obviate the above drawback of stabilized shaped polyoxymethylenes.

In accordance with the invention, this object is achieved by causing an inert gas to flow over the stabilized and shaped solid polyoxymethylenes at elevated temperatures not high enough to cause agglomeration or fusion of the shaped polyoxymethylenes until the volatile formaldehyde has been substantially removed.

The lower limit of the temperature range to be used in carrying out the process of the invention is, in general, about 80° C. However, it is possible to use lower temperatures than this in certain cases if the duration of treatment is prolonged. The upper limit of the said temperature range is, as mentioned above, determined by the onset of agglomeration or fusion of the shaped polyoxymethylenes. In general, this upper temperature limit is about 10° C or more below the melting point of the polyoxymethylene concerned. Usually therefore, the upper temperature limit is one which is 10° C or, preferably, more than 25° C below the melting point of the polymer. In general, maximum temperatures of 140° C are sufficient for reliable deodorization of the industrially important polyoxymethylenes irrespective of their melting point. We usually prefer to use temperatures of from about 110° to 140° C. Obviously, the temperature used in any one case depends, not only on the melting point, but also on the desired rate of deodorization, higher deodorization rates naturally being achieved by the use of higher temperatures.

The process of the invention may be carried out batchwise or continuously, the continuous method being particularly advantageous.

Suitable inert gases are air, nitrogen and, in particular, superheated steam. The latter is generally used at temperatures of from about 120° to 140° C.

The process of the invention may be applied to granules and also shaped articles made therefrom, preferably particulate shaped articles.

The treatment time is governed not only by the temperature used but also by the thickness of the shaped articles. It is from 5 to 100 minutes in the preferred temperature range.

A treatment time of from 10 to 45 minutes is generally sufficient in the preferred temperature range when continuously treating polyoxymethylene granules of cylindrical or spherical form and having a diameter of from about 1 to 5 mm. Fully deodorized molding compositions generally have formaldehyde contents of less than 60 ppm and preferably of from 10 to 40 ppm. These contents may serve as criteria for the duration of deodorization.

Treatment with hot flowing gases may be carried out in conventional apparatus, for example, tubular reactors or fluidized-bed reactors. In the continuous procedure it is advantageous to pass the inert gas countercurrently to the granules. In general the gas is previously heated to the temperature at which the granules or shaped articles are to be treated or a slightly higher temperature. The gas rate is not critical but should equal or exceed the minimum rate necessary for effective removal of the formaldehyde. Where higher gas rates are used, the excessive amount of gas may serve to heat the granules or shaped articles to the treatment temperature.

The molding compositions treated in the manner of the invention may be stored for several months in closed vessels without giving off any formaldehyde odor.

The deodorization of the molding compositions is also accompanied by a drying effect. Furthermore, the polyoxymethylene granules treated in the manner of the invention are, surprisingly, distinctly less prone to form deposits on the mold in injection molding techniques as compared with untreated material.

To check the efficiency of the process of the invention, the monomeric formaldehyde dissolved in the granules is determined by a modification of the sulfite method for determining formaldehyde in the following manner (cf. J. F. Walker, "Formaldehyde", Reinhold Publishing Corp., 1953, page 382):

1 part by weight of polyoxymethylene granules or finely divided molding composition is heated under reflux for 1 hour with 1.5 parts by weight of a 0.5 molar sodium sulfite solution which has been adjusted to pH 9.1. On cooling, the amount of equivalent alkali formed by addition of the formaldehyde to the sulfite is determined by titration.

EXAMPLE 1

400 g of granules of a conventionally stabilized polyoxymethylene copolymer having a content of 3.5% w/w of 1,3-dioxolane, 0.1% w/w of water and 267 ppm of formaldehyde, determined by the above method, were placed in a test tube-shaped vessel having a diameter of 6 cm and a height of 22.5 cm. At a height of 2.5 cm above the bottom of the vessel there was located a glass frit fused to the tube and at the bottom of the tube there was provided a glass tube having a diameter of 0.7 cm and through which nitrogen was passed at a rate of 4 l/hr after having been heated to about 140° C by a gas heater. The glass vessel and glass inlet tube had been placed in an oil bath maintained thermostatically at the gas temperature. The glass vessel was closed by a rubber stopper provided with 2 bores, one for an internal thermometer and one for a gas outlet tube. The off-gas was passed through two wash bottles containing a 0.5 molar sodium sulfite solution at pH 9.1, to determine the amount of formaldehyde driven off.

The system was heated up from 25° to 130° C over 30 minutes, after which the flow of nitrogen was stopped and a sample was taken to determine the formaldehyde content of the granules. The amount of formaldehyde absorbed in the wash bottles was also determined. The wash bottles were then replaced and nitrogen was again passed through the system for 30 minutes at an internal temperature of 137° C, whereupon a sample was taken and the above data were again determined. After a further 30 minutes (internal temperature 140° C), the above procedure was again repeated. Table 1 below lists the results obtained.

TABLE 1

| Amount (ppm) of formaldehyde removed and absorbed in sulfite solution | | | Reduction of formaldehyde content in granules (ppm) | | |
|---|---|---|---|---|---|
| after 0.5 hr | after 1 hr | after 1.5 hrs | after 0.5 hr | after 1 hr | after 1.5 hrs |
| 124 | 229 | 252 | 120 | 236 | 252 |

The residual content of formaldehyde in the granules was 15 ppm and that of water was 0.02%.

The agreement between the amounts of formaldehyde absorbed in the sulfite solution during deodorization and the reduction in the formaldehyde content in the granules demonstrates that said deodorization causes no damage to the molding compositions by degradation.

After storage for 6 months at room temperature in a closed vessel, the treated material has no formaldehyde odor.

EXAMPLE 2

Polyoxymethylene granules which had been stabilized with conventional thermal stabilizers and antioxidants were passed continuously via belt metering equipment to the top of a vertical tube of V4A steel having a heating jacket. Superheated steam at about 135° C was passed to the bottom of the tube. At the same time, nitrogen was passed in at a point below the steam inlet countercurrently to the flow of granules at a rate of about 100 l of nitrogen per hour, this being to ensure that the steam flows countercurrently to the granules and that an inert atmosphere is present at the outlet for the granules. The granules passed through the system at a rate of 2 kg/hr. They were discharged from the system via a vibratory vessel. The residence time of the granules in the tube could be varied from 0.25 to 4 hours depending on the height of the column of granules in the tube. Table 2 below lists the results obtained on a polyoxymethylene copolymer containing 3.9% by weight of 1,3-dioxolane units and having a content of 210 ppm of dissolved monomeric formaldehyde.

TABLE 2

| Treatment time (hrs) | Condition of granules after treatment | Formaldehyde content (ppm) |
|---|---|---|
| 0.1 | smells of formaldehyde | 210 |
| 0.25 | no smell | 28 |
| 0.50 | no smell | 5 |
| 1.00 | no smell | 0 |

The treated granules had no undesirable odor even when stored for 7 months in a closed vessel at 25° C.

We claim:

1. In a method for removing odorous monomeric formaldehyde from stabilized polyoxymethylenes wherein a polyoxymethylene copolymer is prepared by copolymerizing formaldehyde or trioxane with comonomers selected from 1,3-dioxolane, ethyleneoxide, 1,3-dioxepane or polydioxolane, said copolymer is subjected to stabilization by incorporating antioxidants and thermostabilizers in extruders and the copolymers are converted to granules or particulate shaped articles containing from 50 to 1000 ppm of monomeric formaldehyde, the improvement comprising: causing an inert gas to flow over the stabilized and shaped solid polyoxymethylene at a temperature of from about 110° to 140° C, but more than 25° C below the melting point of the polymer until the volatile formaldehyde content of the copolymer is lowered to less than 60 ppm.

2. A method as claimed in claim 1, wherein the inert gas is superheated steam.

3. A method as claimed in claim 1, wherein the treatment with inert gas is effected countercurrently.

4. A method as claimed in claim 1, wherein the stabilized polyoxymethylenes treated are in the form of granules.

5. A method as set forth in claim 1 wherein the volatile formaldehyde content of the copolymer is lowered to from 10 to 40 ppm.

* * * * *

UNITED STATES PATENT AND TRADEMARK OFFICE
CERTIFICATE OF CORRECTION

PATENT NO. : 4,055,547
DATED : October 25, 1977
INVENTOR(S) : DOERFEL ET AL

It is certified that error appears in the above—identified patent and that said Letters Patent are hereby corrected as shown below:

In the heading, after section "[76] Inventors: etc" insert the following section:

--[73] Assignee: BASF Aktiengesellschaft
Ludwigshafen, Germany --.

Signed and Sealed this

Twenty-second Day of May 1979

[SEAL]

Attest:

RUTH C. MASON
Attesting Officer

DONALD W. BANNER
Commissioner of Patents and Trademarks